Nov. 24, 1964     M. JANICKI     3,158,054
ADJUSTABLE RADIUS TURNING TOOL HOLDER APPARATUS
Filed Dec. 13, 1962     2 Sheets-Sheet 1
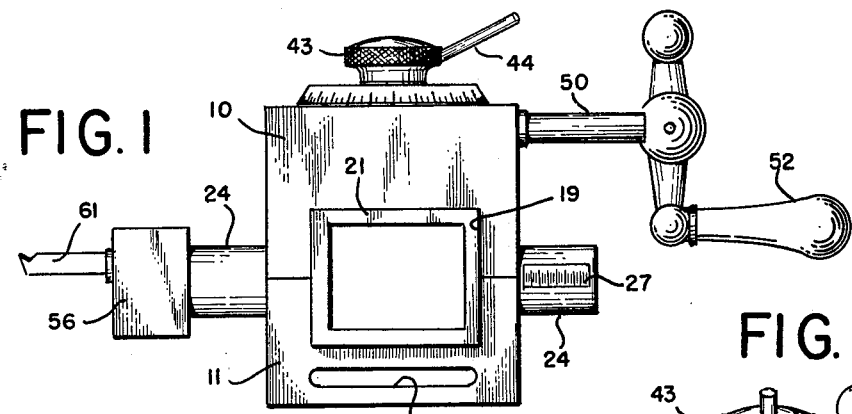
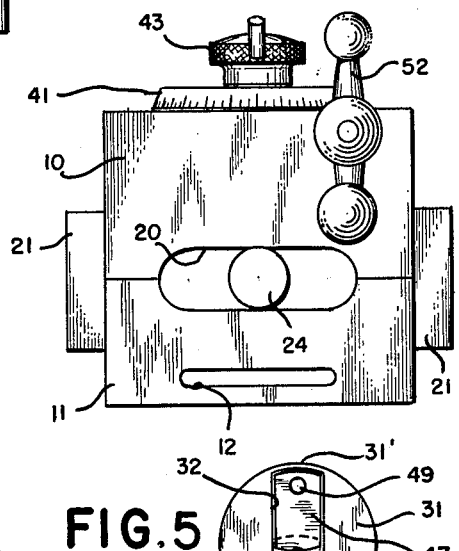
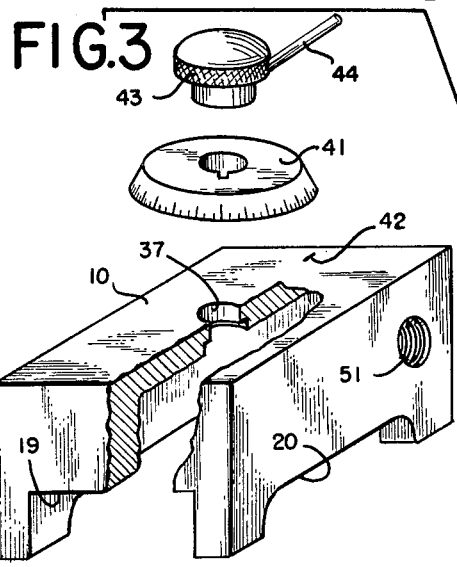
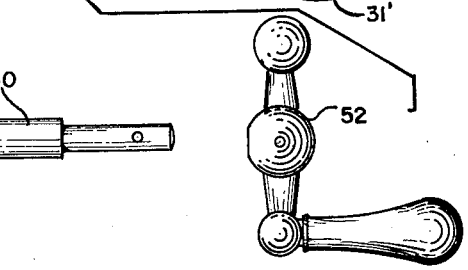
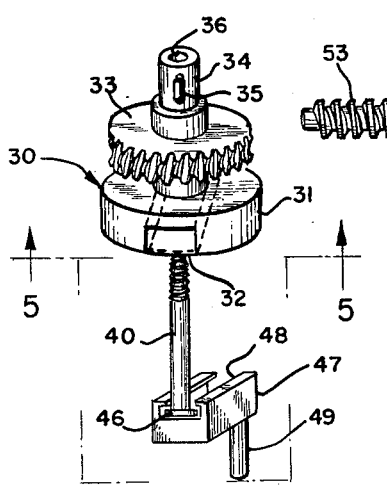
INVENTOR.
M. Janicki
BY
Morsell + Morsell
Attorneys Nov. 24, 1964 M. JANICKI 3,158,054
ADJUSTABLE RADIUS TURNING TOOL HOLDER APPARATUS
Filed Dec. 13, 1962 2 Sheets-Sheet 2
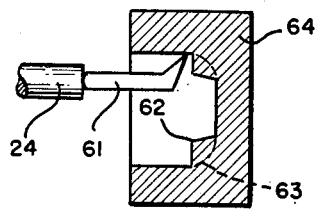
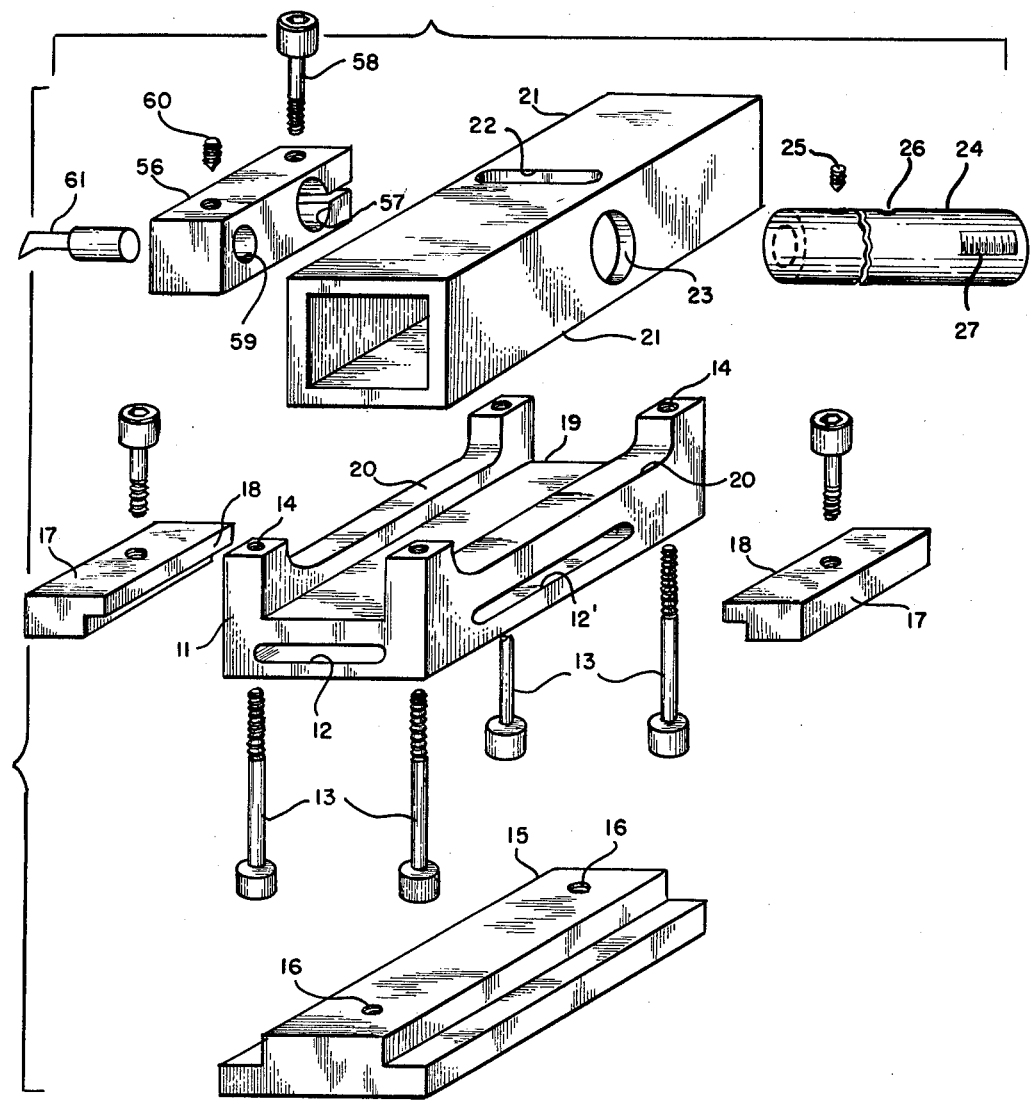
FIG.4
INVENTOR.
M. Janicki
BY
Morsell + Morsell
Attorneys ated Nov. 24, 1964

3,158,054
ADJUSTABLE RADIUS TURNING TOOL HOLDER APPARATUS
Mieczyslaw Janicki, 275 Decorah Road, West Bend, Wis.
Filed Dec. 13, 1962, Ser. No. 244,479
2 Claims. (Cl. 82—12)

This invention relates to an Improved Adjustable Tool Holder for Lathes, and more particularly to a novel tool holder for forming a curved internal or external cut of pre-selected radius.

The principal objects of the present invention are to provide an adjustable tool holder for forming curved surfaces on a workpiece, as described, which device is simple and easy to operate, and which is substantially less expensive in design and construction than the adjustable tool-holding devices in present use.

A more specific object of the present invention is to provide an adjustable tool holder having means for simultaneously moving the cutting tool both longitudinally and laterally relative to a workpiece, thereby following an arcuate cutting path while maintaining the tool parallel to the axis of the work, and which unit includes adjustment and positioning means for controlling the radius and degree of curvature of the cut with great accuracy and precision.

A further object of the invention is to provide an improved adjustable tool holder which can be readily attached to any standard lathe.

With the above and other objects in view, which other objects and advantages of the present structure will become apparent hereinafter, the invention consists of the improved tool holder for lathes or other machine tools described in the following specification and claims, and all equivalents thereof.

In the accompanying drawings, illustrating a preferred form of the invention, and wherein the same reference numerals designate the same parts in all of the views:

FIG. 1 is a side elevational view of the improved tool holder comprising the invention;

FIG. 2 is a rear elevational view of the unit;

FIG. 3 is an exploded perspective view of a portion of the assemblage, parts being broken away and shown in section;

FIG. 4 is an exploded perspective of another portion of the assemblage;

FIG. 5 is a bottom plan view of a part of the radius adjustment mechanism, taken along line 5—5 of FIG. 3; and FIG. 6 is a vertical sectional view through a workpiece, showing a cutting tool in position therein for an internal radius cut.

Referring now more particularly to the drawings, it will be seen that the tool-holding unit comprising the present invention includes a rectangular housing having an upper section 10 and a separable lower section 11, the latter being provided with elongated slots 12 and 12' adjacent the lower edges of its side and front and rear faces, respectively. Said housing sections are joined by means of countersunk screws 13 which are projected upwardly through bores 14 in said housing lower section and into aligned tapped bores in the upper section 10. Formed longitudinally through said housing sections is a bore having rectangular end openings 19, there being an enlarged interior housing cavity associated therewith, and provided in the front and rear walls of said housing sections are mated cutouts which form slotted openings 20 through said walls communicating with said housing interior cavity.

The illustrated embodiment of the invention includes a mounting plate 15 which is designed to slidably fit within the slide or T-slot provided in the surface of a conventional lathe bed, and to mount the present unit on the lathe, a pair of flanged clamping members 17 are screwed onto said plate 15 which the projecting flanges 18 thereon inserted into the aforementioned slots 12 in the housing end walls. If desired, for a particular lathe operation, the entire housing unit can be turned 90° and said clamping members inserted in the slots 12' in the housing front and rear walls.

As will be seen in the drawings, mounted in said housing bore 19, and projecting through said housing, is an elongated hollow rectangular bar 21, hereinafter referred to as the traversing bar, said bar being slidably movable in said bore in a plane transverse to the longitudinal axis of a workpiece to be cut. As shown in FIG. 4, a slotted opening 22 is formed in and through the upper surface of said bar 21 at its longitudinal center point, and also formed through said bar at said center point is a transverse bore 23.

Slidably mounted within the traversing bar bore 23 is a hollow rod or spindle 24 which is movable toward and away from the workpiece, or rectilineally, said spindle being designed to receive the lathe cutting tool 61 in its forward end and being adapted to move or feed said tool longitudinally while the movement of the traversing bar 21 simultaneously shifts said tool laterally relative to the work, as will be hereinafter described. The ends of said spindle 24 project through the aforementioned slotted openings 20 in the housing walls, and carried adjacent the spindle forward end is a tool-retaining screw 25. As shown in FIG. 4, an aperture 26 is formed in the top of said spindle intermediate its length, and marked on the rearwardly-projecting end thereof is a lineal scale 27 having graduations preferably representing minute divisions of an inch, said scale being arranger so that the innermost mark, designated 0, may be positioned flush with the housing rear wall.

With respect now more particularly to FIG. 3, mounted within the housing interior cavity is a rotatable unit 30 having a disc-like bottom portion 31 with an undercut channel 32 extending diametrically across its undersurface, there being a relatively thin wall portion 31' (FIG. 5) defining the ends of said channel. The upper portion of said disc unit includes a concentric circular gear 33, and projecting upwardly therefrom and through an opening 37 in the top of the housing, is a rigid shaft portion 34, there being a vertical center bore 36 extending completely through said disc unit.

Journaled within and projecting through said disc unit vertical bore 36 is an elongated bolt 40 having an enlarged head 46 on its lower end, and having a threaded upper end projecting upwardly beyond the housing top surface. Rotatably carried on the upper portion of said bolt on the housing exterior, and keyed to said rotatable disc shaft 34, is a circular dial 41 which is preferably divided into quadrants having graduations indicating degrees from 1 to 90 in the dial circumference. Threaded onto the upper end of said bolt 40 is a cap or knob 43 having a projecting handle 44, which cap is adapted to be turned to draw said bolt 40 upwardly, as will be described.

With reference still to FIG. 3 of the drawing, a rectangular block member 47, hereinafter referred to as the slide block, is slidably mounted in the channel 32 in the underside of the disc unit 30, said block being of a length approximately equal to the radius of said disc (FIG. 5), and said slide block having a T-slot 48 formed in its upper surface. The head 46 on the lower end of the bolt 40 is fitted within said slot 48 in a manner whereby said block 47 is normally slidable on said bolt head to a desired longitudinal position within the disc channel 32. As hereinabove mentioned, however, the cap 43 on the housing exterior may be turned to draw the bolt 40 upwardly, and by this means said bolt head 46 can be drawn upwardly to raise said block 47 into clamping engagement with the underside of the disc member 30, thereby frictionally preventing sliding movement of said block, and effectively locking the same in a selected longitudinal position within said disc channel 32.

Depending from said slide block 47 adjacent one end thereof is a rigid pin 49, hereinafter called the drive pin, which projects downwardly through the aforementioned slot 22 in the top surface of the traversing bar 21 (FIG. 4), and into the aperture 26 in the top of the spindle 24, thus providing positive engagement between said drive pin and said bar and spindle members. Due to the size of said slide block 47 relative to the channel 32 within which it is mounted, said block being one-half the length of said channel, and due to the location of the depending pin 49 adjacent the end of said block, said drive pin can be positioned either in alignment with the longitudinal center of the disc unit 30, as shown in broken lines in FIG. 5, or it can be moved radially outwardly therefrom to the full line position shown, or any intermediate position, the disc wall portions 31' providing stops therefor. Referring again to FIG. 3, also mounted within and projecting from the housing in the present assemblage is a rod 50 having worm gear threading 53 thereon, and having a projecting end with a turning handle 52 on the housing exterior, said worm gear 53 being positioned to mesh with and drive the aforementioned circular gear 33 on and concentric with the disc unit 30.

As appears in FIGS. 1 and 4, the preferred form of the present invention includes a rectangular tool-holding attachment adapted to be removably mounted on the forward end of the spindle 24, said attachment having a split end bore 57 into which the forwardly-projecting end of said spindle can be inserted, there being a clamping screw 58 therefor. Adjacent the opposite end of said block 56 is a bore 59 which is designed to receive the end of a lathe cutting tool 61, and there being a retaining screw 60 for locking said tool therein. Thus, by means of said tool-holding attachment, it is possible to adjust the height of the cutting tool relative to a workpiece merely by loosen- the clamping screw 58 and rotating the opposite, free end of said attachment about the spindle 24 to either raise or lower said tool, said clamping screw then being tightened again to lock said tool in its adjusted position. Alternatively, adjustment or adapter plates of desired thickness could be secured to the aforementioned mounting plate 15. The particular adjustment means employed is not critical to the present structure, and the invention is not to be limited in this respect.

In the use of the novel tool holder comprising the present invention for forming a blind, internal concave cut in a workpiece, and referring now to FIG. 6 of the drawings, said workpiece 64 is first bored out to the desired depth and width in the conventional manner, and ordinarily an annular shoulder 62 is formed in said bore corresponding to the radius of the intended curved cut, which is shown in dot-dash lines and designated by the numeral 63. With the present unit then mounted on the lathe, and with the attachment member 56 thereon if it is necessary to adjust the position of the cutting tool as described, the cap 43 on the top of the housing is partially unscrewed, to loosen the bolt 40 and to thereby permit longitudinal adjustment of the slide block 47 within the disc channel 32. As mentioned, the disc unit 30 is centered in the housing, and when the radius setting mechanism characterizing the present structure is in its non-operative position said slide block 47 is located with the drive pin 49 thereon in alignment with the vertical axis of said disc unit, or dead center.

When the cap 43 has been loosened as described, the operator manually pushes the spindle 24 forwardly from its normal position, wherein the numeral 0 on the spindle scale 27 is flush with the housing, a distance as indicated on said scale proportionate in a predetermined relation to the desired radius of the cut. Said forward movement of the spindle causes the drive pin 49 to be pulled radially outwardly thereby from its normal, dead center position a corresponding distance exactly equal to the radius of the intended cut, the traversing bar 21 within which said spindle is carried also shifting in a perpendicular plane due to the engagement of said pin 49 within the slot 22 therein. The cap 43 is then tightened to frictionally lock said members in said relative positions, and the dial 41 on the housing top is set at 0 relative to a set point indicator 42 marked on said housing. The cutting operation may then be commenced.

In actual practice, of course, a plurality of cuts are required if the size of the shoulder 62 is at all substantial. During the cutting operation, the operator manually turns the handle 52 to turn the worm gearing 53, said worm meshing with and rotating the circular gear 33 on the disc unit 30. As said disc rotates, the drive pin 49 depending therefrom moves in a circle therewith, of course, and as said pin moves it engages the margin of the slot 22 and causes the traversing bar 21 to move laterally relative to the longitudinal axis of the workpiece. Simultaneously, said drive pin pulls the spindle 24 forwardly, thus causing the cutting tool to move both laterally and longitudinally relative to said workpiece, and resulting in a cut which follows the arc of a circle. As the operator turns said handle 52, he merely has to watch the rotating dial 41, which is keyed to the disc shaft 34, and which corresponds on an enlarged scale to the circular movement of the cutting tool, and correlate the speed of his turning movement with the progress of the depth of the cut to form a curvature arc of any desired degree.

As hereinabove mentioned, the radius of the arc followed by the cutting tool in the present invention is determined by the setting of the slide block 47. When said block is in its normal position, with the drive pin 49 thereon in alignment with the central axis of the disc unit 30, there is no radius cutting. When said pin is shifted radially outwardly, however, an offset drive arrangement is provided, and it is this eccentric relationship between said pin and the axis of the rotating disc unit 30 which causes the traversing bar 21 and spindle 24 to move as described, the elongated nature of the slot 22 in said bar permitting the movement of said members relative to each other.

As will be readily appreciated, in addition to forming a concave curved surface in the interior of a workpiece, as described, a convex interior surface could be similarly formed merely by manually turning the handle 52 in the opposite direction during the cutting operation, thereby reversing the rotation of the disc unit and drive pin, and causing the feed and traversing members to move in an opposite direction. It is also possible of course, to form radial cuts on the exterior of the workpiece, that job being relatively simple as compared to the internal blind cutting operation described.

From the foregoing detailed description it will be seen that the present invention provides a relatively inexpensive tool holder for lathes which permits accurate cutting of a workpiece on a predetermined arc and radius, and which device is simple to operate. With the present invention the cutting tool is always parallel with the axis of the workpiece, which is particularly important when forming internal radius cuts, wherein pivotal movement of the tool, such as is utilized on some conventional radius cutting attachments, is restricted by the size of the bore. Moreover, in the present unit the internal mechanism is not all housed below the cutting tool as in prior toolholding devices, and which prior devices cannot be mounted on many lathes wherein the space between the tool and the lath compound is relatively limited.

It is to be understood that the present invention is not to be limited or confined to a structure identical in all respects to the assemblage illustrated and hereinabove described. It is contemplated that numerous changes or modifications could be made in the illustrated structure, and it is intended to include herein not only the illustrated embodiment, but also any and all modifications or variations thereof which come within the spirit of said invention and within the scope of the following claims.

What I claim is:

1. A tool-holding apparatus for use with a lathe having a workpiece mounted thereon, said apparatus comprising: a housing having front and rear walls, and having a bottom adapted to rest on the lathe bed, said housing having two separable sections; clamping means for detachably securing said housing on the lathe; a traversing bar slidably positioned on said housing bottom and movable in a plane transverse to the axis of the workpiece, said bar having a transverse bore therethrough intermediate its length, and said bar having a transverse slotted top opening intermediate its length communicating with said bore; a spindle slidably mounted in said traversing bar bore and projecting through elongated openings in said housing front and rear walls, there being a top aperture in said spindle intermediate its length, said spindle being movable rectilineally of the workpiece, and said spindle being in substantial aligment with the vertical mid-point of said workpiece; a calibrated scale on the rearward projecting end of said spindle; a cutting tool mounted in the forward end of said spindle, said tool being engageable with the workpiece; a disc unit rotatably mounted horizontally in said housing above said traversing bar and spindle members, said disc unit having a channel extending substantially across its underside; dial means on the housing exterior keyed to said disc unit; a block slidably carried in said disc unit channel, said block being of a length less than the diameter of said disc; a drive pin rigid on and depending from said block adjacent one end thereof, said pin projecting downwardly through the slot in said traversing bar and into the aperture in the top of said spindle, the slidable nature of said block within said channel permitting the shifting of said drive pin to a selected eccentric position relative to the disc unit axis; means for releasably locking said block in a desired position in said disc unit channel; and means on the exterior of said housing for rotataing said disc unit, rotation of said disc causing the drive pin thereon to move said traversing bar laterally while simultaneously moving the spindle carried thereby rectilineally of the workpiece.

2. A tool-holding apparatus for use with a lathe having a workpiece mounted thereon, said apparatus comprising: a housing adapted to rest on the lathe bed; clamping means for detachably securing said housing on the lathe; a traversing member movably mounted in said housing, said member being movable in a plane transverse to the axis of the workpiece; a spindle movably associated with said traversing member and projecting forwardly from said housing toward the workpiece, said spindle being movable rectilineally of the workpiece; means for moving said traversing member laterally while simultaneously moving said spindle rectilineally of the workpiece; and a tool-retaining member rotatably-adjustably and removably mounted on the forward, projecting end of said spindle, said tool-retaining member including a transverse bore adjacent one end into which said spindle is adapted to be inserted, means for releasably locking said member in a selected position of rotatable adjustment on said spindle, a bore adjacent the opposite, free end of said member within which a cutting tool can be inserted, and retaining means for releasably locking said tool therein, the rotatably-adjustable nature of said tool-retaining member on the spindle permitting the accurate setting of said tool relative to the axis of the workpiece.

References Cited by the Examiner

UNITED STATES PATENTS

| 1,931,143 | 10/33 | Feit | 82—12 |
| 3,026,752 | 3/62 | Zabel | 82—12 |

WILLIAM W. DYER, JR., *Primary Examiner.*